United States Patent [19]

Bryant

[11] Patent Number: 4,803,804
[45] Date of Patent: Feb. 14, 1989

[54] TELESCOPIC BELT TIGHTENER

[76] Inventor: Charles B. Bryant, 32380 Wildwood Pt. Rd., Hartland, Wis. 53029

[21] Appl. No.: 95,772

[22] Filed: Sep. 14, 1987

[51] Int. Cl.⁴ ............................................. F16H 7/10
[52] U.S. Cl. .................................. 474/113; 474/136; 198/813
[58] Field of Search .............. 474/136, 111, 109, 101, 474/113, 114, 118; 198/816, 813

[56] References Cited

U.S. PATENT DOCUMENTS

| | | | |
|---|---|---|---|
| 3,118,315 | 1/1964 | Loosli | 474/136 X |
| 3,832,910 | 9/1974 | Bryant | 474/136 |
| 3,921,793 | 11/1975 | Hutchinson | 474/136 X |
| 3,993,185 | 11/1976 | Fleckenstein et al. | 198/818 X |
| 4,007,827 | 2/1977 | Mattos | 198/813 X |
| 4,508,213 | 4/1985 | Kelley | 198/813 |
| 4,544,061 | 10/1985 | Crandall | 198/813 |

Primary Examiner—Jerome W. Massie
Assistant Examiner—Matthew Smith
Attorney, Agent, or Firm—Fuller, Puerner & Hohenfeldt

[57] ABSTRACT

A telescopic belt tensioner includes a pair of housings mounted to the sides of a conveyor bed. Each housing has an outer tube telescopically mounted in it, and an inner tube telescopically received within the outer tube. The inner tube includes means for rotatably supporting a conveyor belt roller. Bolt and nut means between the inner and outer tubes reciprocate the inner tube with respect to the outer tube to provide fine adjustment of the belt tension. A quick release mechanism between the housing and outer tube provides rapid adjustment of belt tension. The quick release mechanism comprises a lever mounted to the housing and a hook mounted to the outer tube, with a pivotable link connecting the lever and hook.

14 Claims, 1 Drawing Sheet

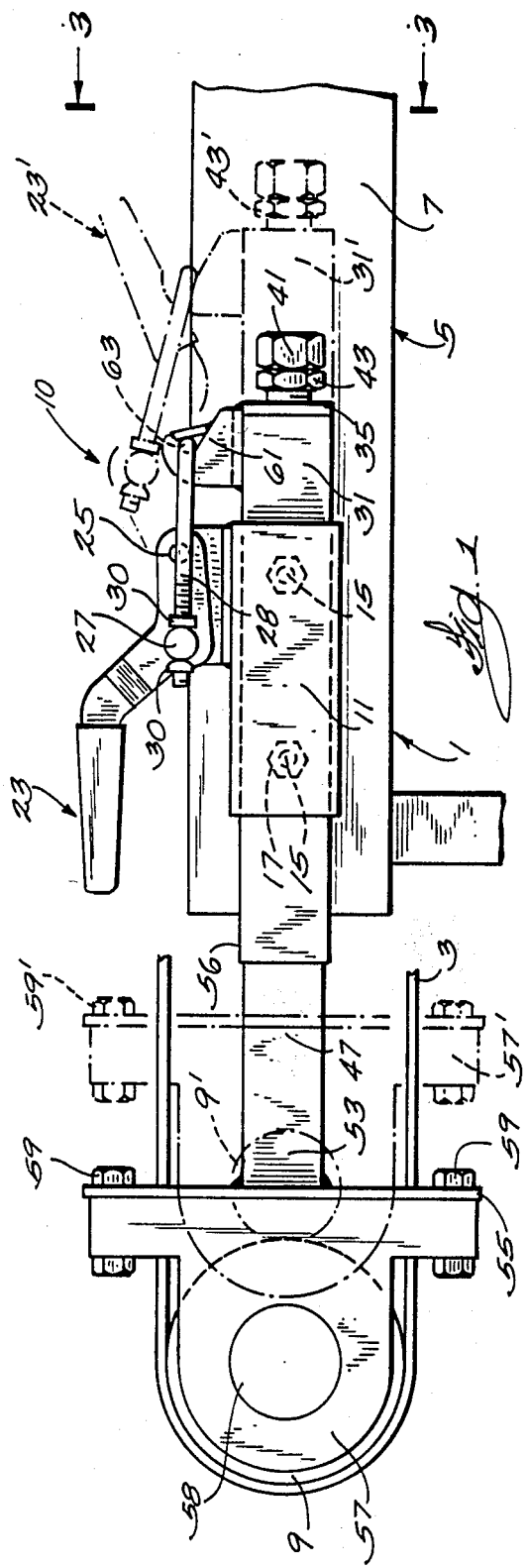

TELESCOPIC BELT TIGHTENER

BACKGROUND OF THE INVENTION

1. Field of the Invention

This invention pertains to tensioning devices, and more particularly to apparatus for adjusting the tension of drive belts.

2. Description of the Prior Art

Various equipment has been developed to adjust the tension of flexible drive belts. Such equipment includes movable idler pulleys or rollers that press transversely against a belt to take up slack.

Tensioning heavy conveyor belts poses particularly difficult problems, because such belts are usually very long and stiff in the longitudinal direction. Prior conveyor belt tensioning devices include four-sided frames fastened to both sides of the conveyor bed. A pair of special pillow blocks support the conveyor end roller. The pillow blocks are adjusted longitudinally with respect to the conveyor bed by means of threaded studs that engage the tensioner frames. Such apparatus possesses the important disadvantage of exposing the adjusting components to the elements and accidental damage. In addition, the tensioner frames protrude beyond the conveyor end roller, thereby increasing overall conveyor length, and the special pillow blocks required add undesirable expense.

An exemplary conveyor belt tensioner is described in U.S. Pat. No. 3,832,910, the disclosure of which is incorporated by reference herein. In the tightener of the 3,832,910 patent, telescoping tubes lie along each side of the conveyor bed. Conventional roller supporting pillow blocks are mounted at one end of the inner tubes, which are supported by and reciprocate within associated outer tubes. The inner tubes are relatively reciprocable for belt tension adjustment by appropriately designed and protected threaded rods and nuts. The telescoping design eliminates the need for any tensioner parts to extend beyond the end roller. Consequently, tensioner space and expense are reduced.

Although the belt tensioner of the 3,832,910 patent has proven very successful, it nevertheless is subject to improvement. A particularly desirable improvement is a device that more quickly adjusts the belt tension for conveyor servicing than is achieved through the threaded adjustment rods.

SUMMARY OF THE INVENTION

In accordance with the present invention, a telescopic belt tensioner is provided that more rapidly and simply changes conveyor belt tension than was previously possible. This is accomplished by apparatus that includes a quick release mechanism in combination with a telescoping fine tension adjustment mechanism.

The telescopic belt tensioner comprises two identical systems, one mounted on each side of the conveyor bed. Each system includes a quick release mechanism comprising a hollow housing fixedly attached to the conveyor bed. A lever is pivotally mounted to the quick release mechanism housing. To the lever is pivotally fastened a link.

An outer tube is slidably received in the hollow quick release housing with at least one end of the outer tube projecting beyond the housing. To the exposed end of the outer tube is fastened a hook for receiving and capturing the link of the quick release lever. Pivoting the lever causes the link to reciprocate the outer tube within the quick release housing.

The tensioner fine adjustment system comprises an inner tube slidably mounted in the outer tube. One end of the inner tube extends beyond an outer tube end. To that end of the inner tube is fastened a standard pillow block. The other end of the inner tube is threaded for receiving a long bolt. The other outer tube end is generally closed with a plate, but the plate has a clearance hole for receiving the bolt. A nut or similar member is welded to the bolt with the outer tube end plate being between the bolt head and the nut, thereby capturing the bolt in the end plate. In that manner, rotating the bolt causes the inner tube to reciprocate within the outer tube.

Actuating the quick release lever to a first position advances the outer tube, the inner tube, and the pillow block in unison in a first direction so as to tighten the conveyor belt. In the first position, the lever is in an over-center locked position. With the lever in the locked advanced position, final belt tightening adjustment is made by rotating the bolt to cause the inner tube and pillow block to advance with respect to the outer tube and housing. To quickly release the tension on the belt, the lever is pivoted approximately 180°, thereby retracting the outer tube, inner tube, and pillow block in unison in a second direction through the quick release mechanism housing. In that manner, the belt tension can be very rapidly removed or applied, and fine adjustment capability is also available.

Other aims and advantages of the invention will become clear to persons skilled in the art upon reading the detailed disclosure.

BRIEF DESCRIPTION OF THE DRAWINGS

FIG. 1 is a side view of the telescopic belt tensioner of the present invention;

FIG. 2 is a partial longitudinal cross sectional view of the belt tensioner of FIG. 1; and FIG. 3 is a cross sectional view taken along lines 3—3 of FIG. 1.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIGS. 1–3, a telescopic belt tensioner 1 is illustrated that includes the present invention. The belt tightener is particularly useful for applying varying amounts of longitudinal tension to a conveyor belt 3, but it will be understood that the invention is not limited to material handling applications.

A conventional conveyor is depicted at reference numeral 5. The conveyor includes a sturdy bed 7 for rotatably mounting rollers, such as an end roller 9, that support the belt 3.

In accordance with the present invention, a telescopic belt tensioner 1 is fixedly mounted to each side of the conveyor bed 7 for adjusting the tension in the belt 3. The belt tensioners on the two sides of the bed are identical in construction and operation, so the description of one of them is sufficient. The belt tensioner comprises a quick release mechanism 10 having a housing 11 that preferably is fabricated as a square tube. To one side 13 of the housing 11 may be welded a pair of studs 15 that pass through aligned holes in the conveyor bed. The housing is firmly secured to the conveyor bed by nuts and washers 17.

Near one end of the housing 11 are fastened a pair of L-shaped brackets 19 with their respective upstanding legs 21 in facing contact. Straddling the bracket legs 21 is a lever 23 that is pivotally mounted at one end thereof to the brackets 19 by a pin 25. Also pivotally mounted to the lever 23 is a second pin 27, received in which is a link 28. In the illustrated construction, the link 28 is in the form of a U-bolt having legs retained in the pin 27 by nuts 30.

Slidingly installed in the quick release housing 11 is an outer tube 31 having a square cross section sized to slide freely within the housing. The outer tube 31 preferably extends out both ends of the housing. To the outer tube first end 33 is welded an end plate 35 having an opening 37. Extending through the end plate opening 37 is a bolt 39 having a head 41. A lock nut 43 is threaded onto the bolt 39. A second nut or similar part 45 is welded to the bolt on the opposite side of the end plate 35 as the bolt head 41, thereby capturing the bolt in the outer tube. It will be appreciated, of course, that the nut 45 may be welded to the bolt before the end plate 35 is welded to the outer tube.

Slidingly received in the quick release mechanism outer tube 31 is a fine adjustment mechanism 29. In the preferred embodiment, the fine adjustment mechanism 29 comprises an inner tube 47 that freely fits within the outer tube 31. To the first end 49 of the inner tube 47 is welded a nut 51 that mates with the bolt 39. Thus, rotating the bolt captured in the outer tube end plate 35 causes the inner tube to reciprocate within the outer tube.

The second end 53 of the inner tube 47 extends beyond the second end 54 of the quick release housing 11 and the second end 56 of the outer tube. To the inner tube second end 53 is secured a plate 55 that supports a conventional pillow block 57. Attachment of the pillow block 57 to the plate 55 may be by conventional fasteners 59. The pillow block rotatably supports the shaft 58 of the conveyor roller 9.

Fastened to the outer tube 31 near its first end 33 is a generally C-shaped hook 61. The hook 61 has a notch 63 sized to receive the loop end of the U-bolt 28. The U-bolt loop end is captured in the hook notch 63 by a small plate 65 welded to the hook.

As best seen in FIG. 1, the lever 23 is pivotable between a first position shown by the solid lines and a second position shown at phantom lines 23'. In the first position, the lever pin 25, U-bolt pin 27, and notch 63 are approximately coplanar, but the U-bolt pin is slightly below the plane joining the lever pin and the notch. Consequently, the lever is in an over-center locked configuration when in the first position.

Pivoting the lever 23 to the first position actuates the U-bolt 28, hook 61, and outer tube 31 to advance the inner tube 47, pillow block 57, and roller 9 to the left with respect to FIGS. 1 and 2. As a result, tension is produced in the conveyor belt 3. Final fine adjustment of the belt tension is accomplished by rotating bolt 39 by means of its head 41. The lock nut 43 is backed off the outer tube end plate 35 during fine adjustment, as shown in FIG. 1. After the final tension setting is made, the lock nut can be firmly torqued against the outer tube end plate, FIG. 2.

To quickly and easily remove tension from the conveyor belt 3 for servicing or other purposes, the lever 23 is pivoted to the position of the phantom lines 23' in FIG. 1. Pivoting the lever to the second position 23' causes the U-bolt 28 to push against the plate 65 and thereby force the outer tube 31, inner tube 47, pillow block 57, and roller 9 in unison to the retracted positions shown by the respective phantom lines of FIG. 1. If necessary, additional slack in the belt can be obtained by turning the bolt 39 to telescope the inner tube within the outer tube. After belt or other conveyor servicing is completed, the belt is speedily retensioned by returning the lever 23 to the locked first position of FIGS. 1 and 2.

Thus, it is apparent that there has been provided, in accordance with the invention, a telescopic belt tensioner that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

I claim:

1. A telescopic belt tensioner comprising:
   a. a hollow housing;
   b. an outer tube slidably received within the housing and having first and second ends;
   c. an inner tube having first and second ends and slidably received within the outer tube;
   d. means connected to the inner tube second end for supporting a belt roller;
   e. means connected to the outer tube and inner tube first ends for telescopically adjusting the positioning of the inner tube with respect to the outer tube; and
   f. quick release means for telescopically reciprocating the outer tube and inner tube in unison with respect to the housing.

2. The telescopic belt tensioner of claim 1 wherein the housing, outer tube, and inner tube are fabricated as interfitting square tubes.

3. A telescopic belt tensioner comprising:
   a. a hollow housing
   b. an outer tube slidably received within the housing and having first and second ends;
   c. an inner tube having first and second ends and slidably received within the outer tube;
   d. means connected to the inner tube second end for supporting a belt roller;
   e. means connected to the outer tube and inner tube first ends for telescopically adjusting the positioning of the inner tube with respect to the outer tube; and
   f. quick release means for telescopically reciprocating the outer tube and inner tube in unison with respect to the housing,
   wherein the quick release means comprises:
      i. a lever pivotally mounted to the housing;
      ii. a hook mounted to the outer tube; and
      iii. link means joining the lever and the hook for reciprocating the outer tube with respect to the housing in response to pivoting the lever.

4. The telescopic belt tensioner of claim 3 wherein:
   a. the link means comprises a U-bolt having legs end pivotally attached to the lever and a loop end; and b. the hook includes plate means for capturing the U-bolt loop end within the hook.

5. In combination with a conveyor having a bend; an end roller longitudinally adjustable with respect to the bed; and a belt trained over the roller,
a telescopic belt tensioner comprising:
a. a housing fixedly mounted to the conveyor bed;
b. an outer tube slidably received in the housing and having first and second ends;
c. an inner tube having first and second ends and being slidably received within the outer tube, the inner tube second end extending from the outer tube second end;
d. support means mounted to the inner tube second end for rotatably supporting the conveyor roller;
e. adjustment means for providing fine adjustment to the belt tension; and
f. quick release means connecting the housing and the outer tube for selectively advancing and retracting the outer tube and inner tube in unison with respect to the housing to thereby provide rapid adjustment to the belt tension.

6. The combination of claim 5 wherein the housing, outer tube, and inner tube are comprised of square tubing.

7. In combination with a conveyor having a bed; an end roller longitudinally adjustable with respect to the bed; and a belt trained over the roller,
telescopic belt tensioner comprising:
a. a housing fixedly mounted to the conveyor bed;
b. an outer tube slidably received in the housing and having first and second ends;
c. an inner tube having first and second ends and being slidably received within the outer tube, the inner tube second end extending from the outer tube second end;
d. support means mounted to the inner tube second end for rotatably supporting the conveyor roller;
e. adjustment means for providing fine adjustment to the belt tension; and
f. quick release means connecting the housing and the outer tube for selectively advancing and retracting the outer tube and inner tube in unison with respect to the housing to thereby provide rapid adjustment to the belt tension,
wherein the quick release means comprises:
  i. a lever pivotally mounted to the housing;
  ii. a hook mounted to the outer tubing; and
  iii. link means for joining the lever and the hook for advancing and retracting the outer tube with respect to the housing in response to pivoting the lever.

8. The combination of claim 7 wherein:
a. the outer tube first end extends from the housing in a direction opposite from the conveyor belt roller; and
b. the hook is mounted to the outer tube first end,
so that pivoting the lever to a first position telescopes the outer tube and inner tube first ends in unison into the housing to force the conveyor roller away therefrom to increase belt tension and pivoting the lever to a second position telescopes the outer tube and inner tube first ends outwardly from the housing to release belt tension.

9. The combination of claim 7 wherein:
a. the link means comprises a U-bolt having leg ends pivotally attached to the lever and a loop end; and
b. the hook includes plate means for capturing the U-bolt loop end within the hook.

10. In combination with a conveyor having a bed; an end roller longitudinally adjustable with respect to the bed; and a belt trained over the end roller;
a telescopic belt tensioner comprising:
a. quick release means attached to the conveyor bed for providing rapid adjustment to the belt tension;
b. fine adjustment means attached to the quick release means for providing fine adjustment to the belt tension; and
c. support means attached to the fine adjustment means for providing sole support to the conveyor end roller with respect to the bed.

11. The combination of claim 10 wherein:
a. the quick release means comprises:
  i. a housing mounted to the conveyor bed;
  ii. tubing means for reciprocating within the housing; and
  iii. means for rapidly reciprocating the tubing means and support means relative to the housing to thereby rapidly adjust the belt tension;
b. the tubing means comprises an outer tube slidably received within the housing;
c. the fine adjustment means comprises an inner tube slidably received within the outer tube;
d. the support means is attached to the inner tube; and
e. the means for reciprocating the tubing means and support means comprises actuating means connecting the housing to the outer tube.

12. In combination with a conveyor having a bed; an end roller longitudinally adjustable with respect to the bed; and a belt trained over the end roller,
a telescopic belt tensioner comprising:
a. quick release means attached to the conveyor bed for providing rapid adjustment to the belt tension, the quick release means comprising:
  i. a housing mounted to the conveyor bed;
  ii. tubing means for reciprocating within the housing, the tubing means comprising an outer tube slidably received within the housing; and
  iii. means for rapidly reciprocating the tubing means and support means relative to the housing to thereby rapidly adjust the belt tension, the means for reciprocating the tubing means and support means comprising actuating means connecting the housing to the outer tube,
wherein the actuating means comprises:
  i. a lever pivotally mounted to the housing;
  ii. a hook mounted to the outer tube; and
  iii. link means joining the lever and the hook for reciprocating the outer tube with respect to the housing in response to pivoting the lever;
b. fine adjustment means attached to the quick release means for providing fine adjustment to the belt tension, the fine adjustment means comprising an inner tube slidably received within the outer tube; and
c. support means attached to the fine adjustment means for supporting the conveyor roller, the support means being attached to the inner tube.

13. The combination of claim 12 wherein:
a. the link means comprises a U-bolt having leg ends pivotally attached to the lever and a loop end; and
b. the hook includes plate means for capturing the U-bolt loop end within the hook.

14. The combination of claim 12 wherein the housing, outer tube, and inner tube are fabricated as interfitting square tubes.

* * * * *